United States Patent [19]

Levine

[11] Patent Number: 4,623,916

[45] Date of Patent: Nov. 18, 1986

[54] DETECTOR ASSEMBLY FOR A TELEVISION CAMERA

[75] Inventor: Aaron W. Levine, Lawrence Township, Mercer County, N.J.

[73] Assignee: RCA Corporation, Princeton, N.J.

[21] Appl. No.: 650,635

[22] Filed: Sep. 14, 1984

[51] Int. Cl.[4] .......................... H04N 9/04; H04N 9/09
[52] U.S. Cl. ........................................ 358/50; 358/55; 358/41; 350/172
[58] Field of Search .................. 156/330, 314; 358/41, 358/43, 44, 50, 55, 213; 350/320, 172

[56] References Cited

U.S. PATENT DOCUMENTS

| | | | |
|---|---|---|---|
| 4,070,225 | 1/1978 | Batdorf | 156/330 |
| 4,323,918 | 4/1982 | Bendell | 358/50 |
| 4,330,353 | 5/1982 | Kunimoto | 156/314 |
| 4,555,163 | 11/1985 | Wagner | 350/172 |

OTHER PUBLICATIONS

Patent application of Z. M. Andrevski, Ser. No. 595,528, filed Mar. 30, 1984, entitled "Television Camera with Solid-State Imagers Mounted to a Prism".

*Primary Examiner*—James J. Groody
*Assistant Examiner*—John K. Peng
*Attorney, Agent, or Firm*—Birgit E. Morris; Donald S. Cohen

[57] ABSTRACT

A solid-state detector assembly for a television camera includes a beam-splitting prism having an inlet port and three outlet ports. A pair of mounting plates each having opposed major surfaces extend across the top and bottom of the prism and have a major surface secured to the prism. Each of the mounting plates has a separate pair of spaced slots in its edge adjacent each of the outlet ports. Each of the slots in one of the mounting plates is aligned with a separate slot in the other mounting plate. A separate pair detector support rods extends between the mounting plates adjacent each outlet port. Each of the detector support rods extends through the slots in the mounting plates and projects beyond the major surfaces of the mounting plates. A separate detector is mounted on each of the pair support rods and extends across an outlet port. Each of the detector support rods is secured to the mounting plates by fillets of a bonding material which extend only between the detector support rods and a major surface of the mounting plates.

8 Claims, 3 Drawing Figures

DETECTOR ASSEMBLY FOR A TELEVISION CAMERA

The present invention relates to a structure of a charge-coupled device (CCD) camera, and, more particularly, to a structure for mounting CCD imagers to a light-splitting prism which can be easily repaired.

BACKGROUND OF THE INVENTION

One form of a television camera includes a light-splitting prism for dividing the light into different colored components, such as red, green and blue components, and a separate solid-state charge-coupled (CCD) image pickup device mounted on the prism for receiving each color component. U.S. Pat. No. 4,323,918, entitled "Optical Assembly For Color Television", issued Apr. 6, 1982 to S. L. Bendell describes a camera which includes solid-state imagers in conjunction with a beam-splitting prism. However, a problem found in making such a camera is to mount the solid-state imagers on the prism in a manner that will provide an assembly having structural integrity so that the prism will not break during operation and use of the camera.

As described in the co-pending application for Letters Patent of Z. M. Andrevski, Ser. No. 595,528 filed Mar. 30, 1984, entitled "Television Camera With Solid-State Imagers Mounted To A Prism", now U.S. Pat. No. 4,591,901, issued May 27, 1986 assigned to the same assignee as the present application and which is incorporated herein by reference, there has been developed a light-splitting prism, solid-state detector assembly which has good structural integrity. In general, this assembly includes a pair of substantially identical mounting plates secured to the top and bottom of the prism. The prism has at its edges an inlet port for receiving the light from the image being detected, and three outlet ports, one for each of the color components. The mounting plates have a pair of spaced notches in their edges adjacent each outlet port of the prism. The notches in the top mounting plate are in alignment with the notches in the bottom mounting plate. Each solid-state detector is mounted across a pair of spaced, parallel rods. The solid-state detector and rod subassembly is then mounted between the mounting plates with the ends of the rods fitting into the notches in the mounting plates and the detectors extending across an outlet port of the prism. The rods are secured to the mounting plate with a suitable cement.

In this assembly it is necessary that each of the detectors is exactly positioned over its respective outlet port of the prism so that there is proper registration of the three images detected by the detectors. Thus, if after the three detectors are mounted on the mounting plates it is found that one or more of the detectors is not in proper registration, the detector and rod subassembly must be removed to reassemble the detector. Also, if after the detectors are assembled on the mounting plates one is found to be defective for any reason, it must be removed. Therefore, it is necessary to secure the rods to the mounting plates in a manner which will permit the removal of the rods with ease and without damaging the detector.

SUMMARY OF THE INVENTION

A detector assembly for a television camera includes a light-splitting prism having upper and lower surfaces and at its edges an input port and at least one output port. A pair of mounting plates, each having a pair of opposed major surfaces, are along the upper and lower surfaces of the prism and have a major surface secured to the prism. Support means extend between the mounting plates at the outlet port. The support means is secured to the mounting plates by means which is only between the support means and the major surfaces of the mounting plates. A detector is secured to the support means and extends across the outlet port.

DETAILED DESCRIPTION OF PREFERRED EMBODIMENT

Figure 1:
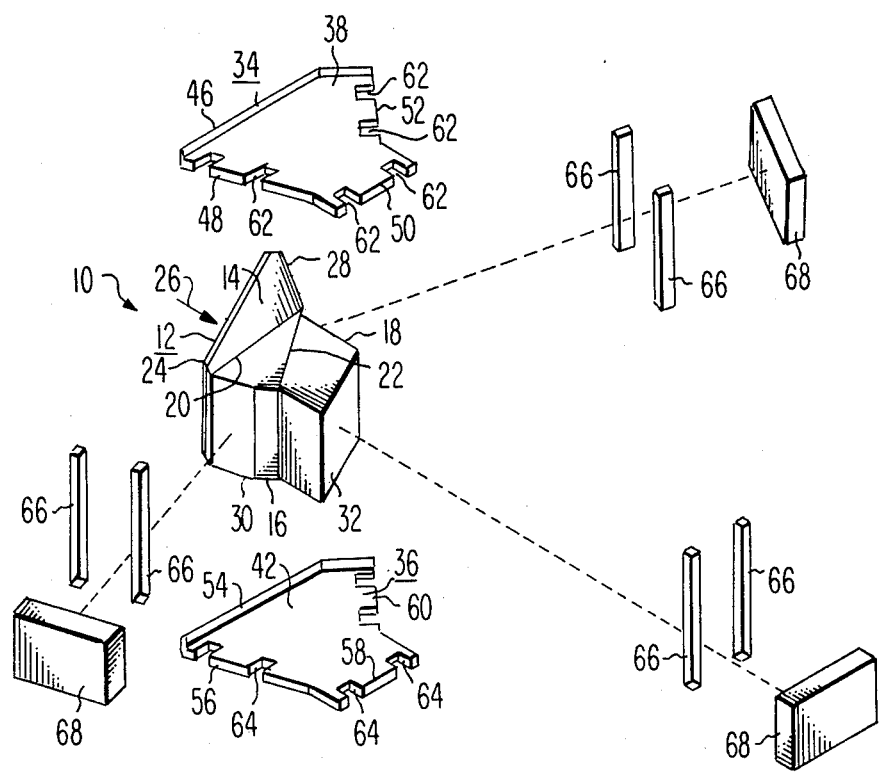
FIG. 1 is an exploded perspective view of a detector assembly which can incorporate the present invention.
Figure 2:
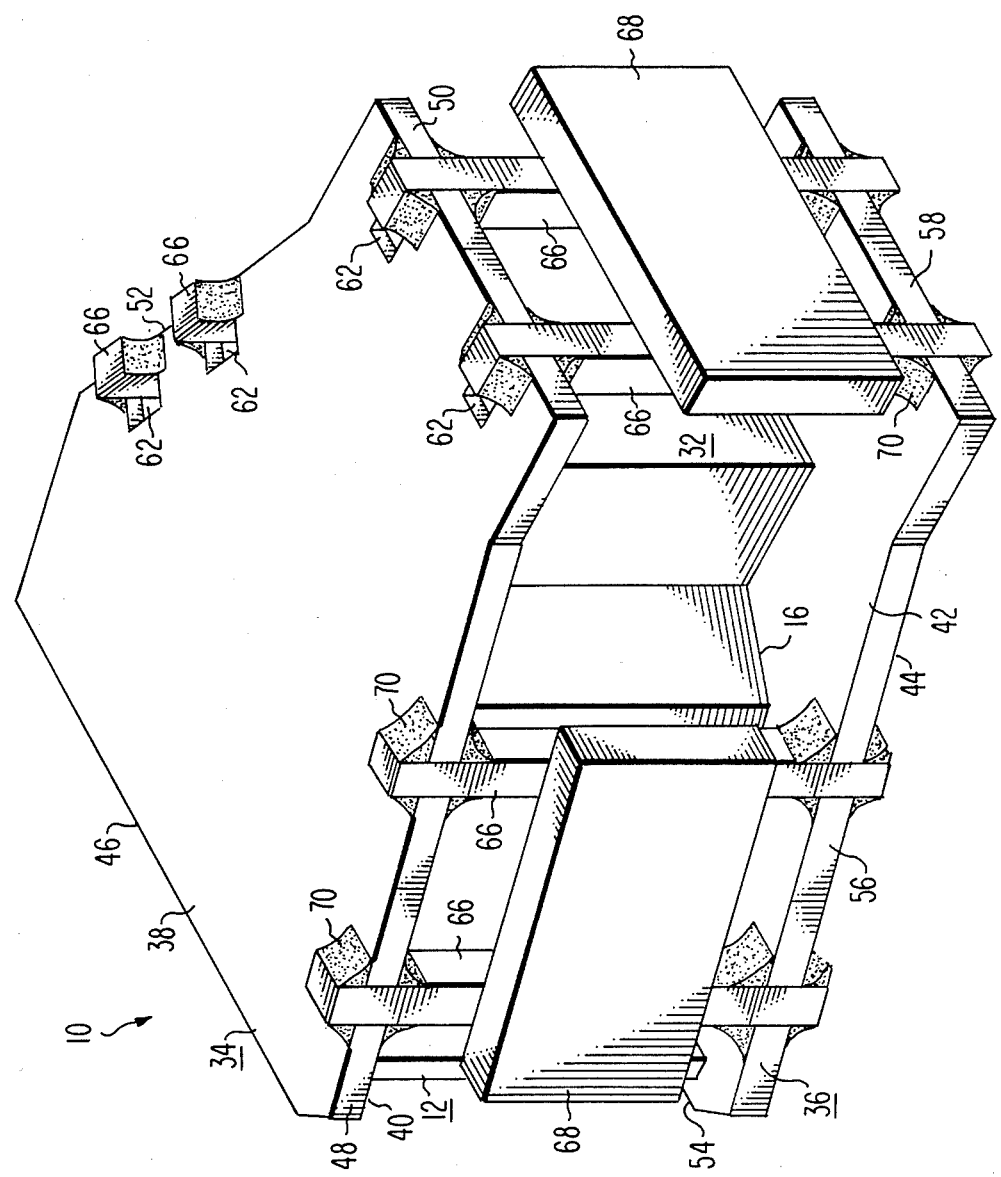
FIG. 2 is a perspective view of the assembled detector assembly incorporating the securing means of the present invention.

Referring to FIGS. 1 and 2, a detector assembly which can incorporate the present invention is generally designated as 10. As shown in FIG. 1, the assembly 10 includes a beam-splitting prism 12 formed of three optical glass blocks 14, 16 and 18 secured together to provide two optical interfaces 20 and 22. The block 14 includes an input port 24 through which light enters the prism 12 along an axis indicated by the arrow 26. The block 14 also includes an output port 28 which emits the blue component of the light which is reflected to the outlet port 28 by the interface 20 and a reflective inner surface of the input port 24. The block 16 has an output port 30 which emits the red component of the light which is reflected thereto first by the interface 22 and then the interface 20. The remaining green component of the light passes completely through the prism and is emitted by the output port 32 on the block 18.

A pair of identical mounting plates 34 and 36 are secured to the top and bottom surface respectively of the prism 12. The mounting plate 34 has a pair of opposed major surfaces 38 and 40 with the major surface 40 being seated on and secured to the prism 12 with a suitable cement. The mounting plate 36 also has a pair of opposed major surfaces 42 and 44 with the major surface 42 being seated on and secured to the prism 12 with a suitable cement. The mounting plate 34 has straight edges 46, 48, 50 and 52 which are in alignment with the input port 24 and the output ports 30, 32 and 28 respectively. The mounting plate 36 similarly has edges 54, 56, 58 and 60 which are in alignment with the input port 24 and the output ports 30, 32 and 28 and the corresponding edges 46, 48, 50 and 52 of the mounting plate 34. Each of the edges 48, 50 and 52 of the mounting plate 34 has a pair of spaced slots 62 therein. Each of the edges 56, 58 and 60 of the mounting plate 36 has a pair of spaced slots 64 therein. Each of the slots 62 in the mounting plate 34 is aligned with a separate one of the slots 64 in the mounting plate 36.

Detector supporting means in the form of a pair of spaced, parallel rods 66 extend between the mounting plates 34 and 36 at each of the pairs of aligned edges 48 and 56, 50 and 58, and 52 and 60 respectively. The end portions of the rods 66 fit in the opposed slots 62 and 64 and project beyond the major surfaces 38 and 44 of the mounting plate 34 and 36 respectively. A separate solid-state detector, such as a CCD image sensor 68, extends across and is secured to each pair of rods 66 with the image receiving surface of the detector 68 facing the respective outlet port 28, 30 and 32.

Each of the rods 66 is secured to the mounting plates 34 and 36 by fillets 70 of a bonding material, such as an epoxy cement. The fillets 70 extend only between the rods 66 and a major surface of the mounting plate. Thus, each rod 66 is secured to the mounting plate 34 by fillets 70 which extend between the sides of the rods 66 and the major surfaces 38 and 40, and the rods 66 are secured to the mounting plate 36 by fillets 70 which extend between the sides of the rods 66 and the major surfaces 42 and 44 of the base plate 36. Care must be taken that the bonding material does not extend into the slots 62 and 64 or between the sides of the rods 66 and the edge surfaces of the slots 62 and 64. Although the bonding fillets 70 strongly bond the rods 66 to the mounting plates 34 and 36, by having the fillets 70 extend only between the rods 66 and the major surfaces of the mounting plates 34 and 36, the bond between the rods 66 and the mounting plates 34 and 36 can be easily broken to permit removal of the rods 66. This can be achieved by sliding the blade of a knife or razor between the fillet 70 and either the major surface of the mounting plate or the side surface of the rods 66 to break the bond. Once the bond between each of the fillets and its adjacent mounting plate or rod is broken, the rods 66 can be easily removed from the slots 62 and 64. However, if the bonding cement was within the slot 62 and 64 or between the rod 66 and the edge surface of the slot, it would be very difficult to break the bond to permit removal of the rods. Thus, the bonding technique of the present invention allows for ease of removal of the rods 66 without damaging the detector 68.

To form the bond between the rods 66 and the mounting plates 34 and 36, after the rods 66 are inserted in the slot 62 and 64, the bonding material may be applied across the interface between the sides of the rods 66 and the major surfaces of the mounting plates by means of a syringe or other suitable applicator which can be passed across the interface between the rods and the major surface of the mounting plate and emit a controlled amount of bonding material to form the fillets 70. Alternatively, before inserting the rods 66 into the slots 62 and 64, a small quantity of the bonding material may be applied along each of the major surfaces of the mounting plates 34 and 36 adjacent the side edges of the slots 62 and 64 and a small amount of the cement may be applied to the sides of the rods 66. When the rods are inserted into the slots 62 and 64 the bonding material on the major surfaces of the mounting plates 34 and 36 will cohere with the bonding material on the sides of the rods 66 to form the fillets 70. Thus, the fillets 70 of the bonding material can be easily provided between only the sides of the rods 66 and the major surfaces of the mounting plates 34 and 36 without any of the bonding material getting within the slots 62 and 64.

Figure 3:
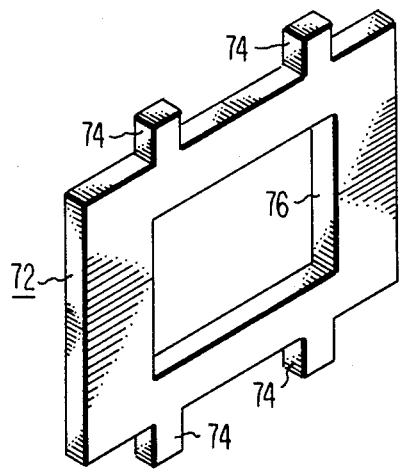
FIG. 3 is a perspective view of a modification of the detector support means which can be used in the detector assembly.

Referring to FIG. 3, a modification of the detector mounting means which can be used in the assembly 10 in place of the rods 66 is generally designated as 72. The detector mounting means 72 is a rectangular plate having a pair of spaced, parallel fingers 74 projecting from each of two opposed side edges thereof and a rectangular opening 76 through the center thereof. The detector 68 is mounted on the plate 72 with the sensing area of the detector 68 extending across the opening 76. The plate 72 is mounted between the mounting plates 34 and 36 with the fingers 74 fitting in and extending through the slots 62 and 64. The plate 72 is secured to the mounting plates 34 and 36 by fillets 70 of the bonding material extending between the sides of the finger 74 and the adjacent major surface of the adjacent mounting plate.

I claim:

1. In a detector assembly for a television camera which comprises
   a light-splitting prism having upper and lower surfaces and at its edge an input port and at least one output port,
   a pair of mounting plates each having a pair of opposed major surfaces, said mounting plates being along the upper and lower surfaces of said prism and having a major surface secured to said prism,
   detector support means extending between said mounting plates adjacent an outlet port,
   means securing said support means to said mounting plates, and
   a detector secured to said support means and extending across said outlet port, the improvement comprising
   the means securing the support means to the mounting plates being only between the support means and the major surfaces of the mounting plates.

2. A detector assembly in accordance with claim 1 in which the means securing the support means to the mounting plate comprises fillets of a bonding material extending only between the support means and the major surfaces of the mounting plates.

3. A detector assembly in accordance with claim 2 in which each of the mounting plates has a pair of spaced slots in its edge adjacent the prism outlet port with each slot in one of the mounting plates being aligned with a separate slot in the other mounting plate and the detector support means extends through said slots.

4. A detector assembly in accordance with claim 3 in which the detector support means includes a pair of rods which extend between the mounting plates with the end portions of each of the rods extending through a pair of aligned slots and projecting beyond a major surface of the mounting plates.

5. A detector assembly in accordance with claim 4 in which the fillets of bonding material extend only between the sides of the rods and the major surface of the mounting plates adjacent the edges of the slots.

6. A detector assembly in accordance with claim 5 in which there are fillets of bonding material between the side surfaces of each of the rods and each of the major surfaces of each of the mounting plates.

7. A detector assembly in accordance with claim 3 in which the detector support means is a rectangular plate having an opening through the center thereof and a pair of spaced legs projecting from each of a pair of opposed edges, the detector support plate extends between the mounting plates with each of the legs extending through a separate slot and projecting beyond the major surface of a mounting plate, the fillets of the bonding material are only between the sides of the legs and the major surfaces of the mounting plates adjacent the edges of the slots, and a detector is mounted across the opening in the support plate.

8. A detector assembly in accordance with claim 2 in which the prism has a plurality of outlet ports, the mounting plates have a pair of slots in their edges adjacent each outlet port, a separate detector support means extends between the mounting plates adjacent each outlet port with the detector support means extending through the slots in the mounting plates, fillets of bonding material extend only between each of the detectors support means and the major surfaces of the mounting plates, and a separate detector is mounted on each of said detector support means.

* * * * *